US012643323B2

(12) United States Patent
Song et al.

(10) Patent No.: US 12,643,323 B2
(45) Date of Patent: Jun. 2, 2026

(54) APPARATUS FOR INSPECTING DROPLET AND METHOD FOR INSPECTING DROPLET USING THE SAME

(71) Applicant: Samsung Display Co., LTD., Yongin-si (KR)

(72) Inventors: Taeyoung Song, Yongin-si (KR); Jinwon Kim, Yongin-si (KR); Hye-Jin Paek, Yongin-si (KR); Won-Gap Yoon, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 240 days.

(21) Appl. No.: 18/635,888

(22) Filed: Apr. 15, 2024

(65) Prior Publication Data

US 2025/0042152 A1     Feb. 6, 2025

(30) Foreign Application Priority Data

Aug. 2, 2023     (KR) ........................ 10-2023-0101230

(51) Int. Cl.
  *B41J 2/045*          (2006.01)
  *G01N 21/95*          (2006.01)

(52) U.S. Cl.
  CPC ......... *B41J 2/04586* (2013.01); *B41J 2/0456* (2013.01); *G01N 21/95* (2013.01)

(58) Field of Classification Search
  None
  See application file for complete search history.

(56)                References Cited

U.S. PATENT DOCUMENTS

2006/0146077 A1     7/2006   Song et al.
2009/0309920 A1*   12/2009   Hayashi ................... B41J 2/195
                                                           347/34

* cited by examiner

*Primary Examiner* — Thanh Luu
(74) *Attorney, Agent, or Firm* — CANTOR COLBURN LLP

(57)                ABSTRACT

An apparatus for inspecting a plurality of droplets includes an inspection substrate defining a penetrating area corresponding to a nozzle portion that discharges the plurality of droplets, the penetrating area through which at least some of the plurality of droplets, which are discharged from the nozzle portion, pass and a camera that measures a droplet, among the plurality of droplets, disposed on one surface of the inspection substrate without passing the inspection substrate through the penetrating area.

20 Claims, 11 Drawing Sheets

FIG. 1
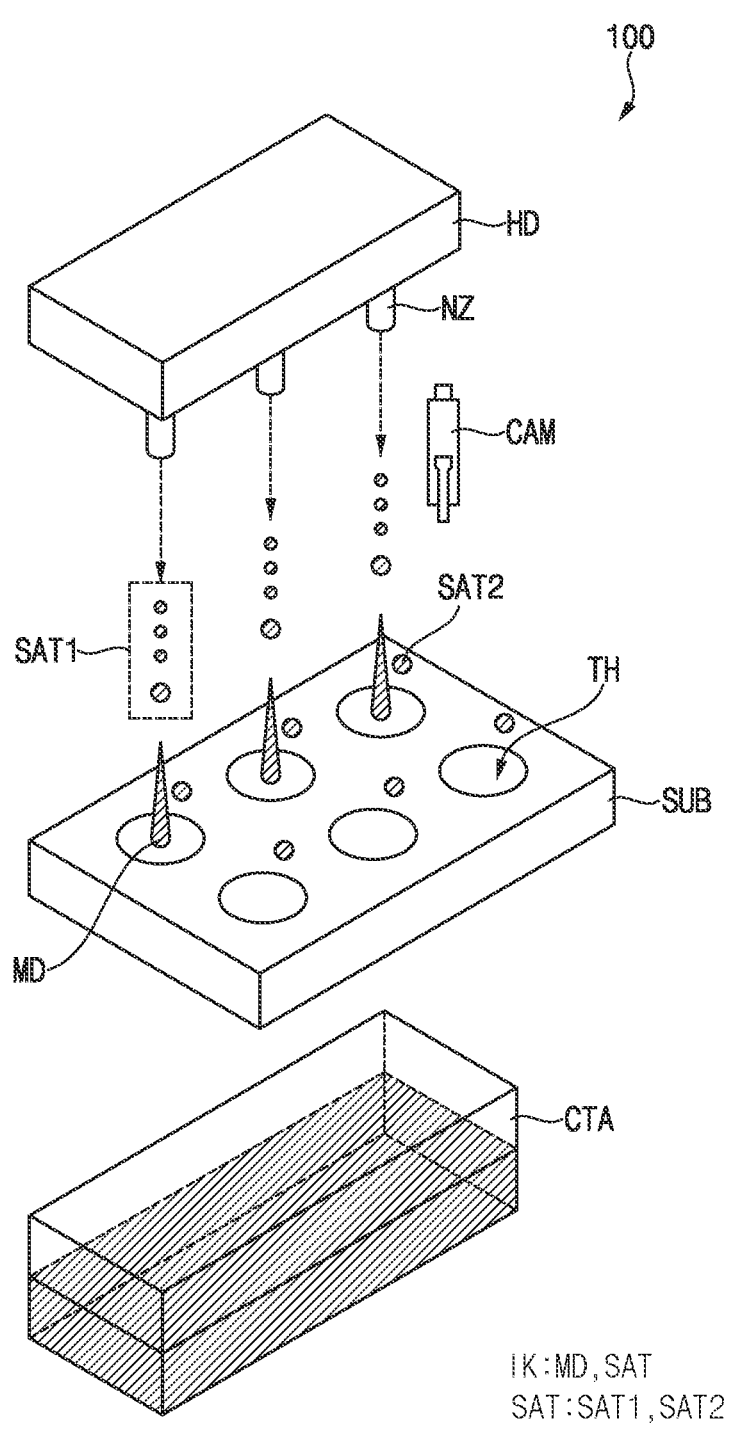
IK:MD,SAT
SAT:SAT1,SAT2
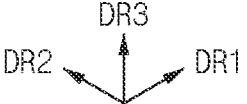

FIG. 2
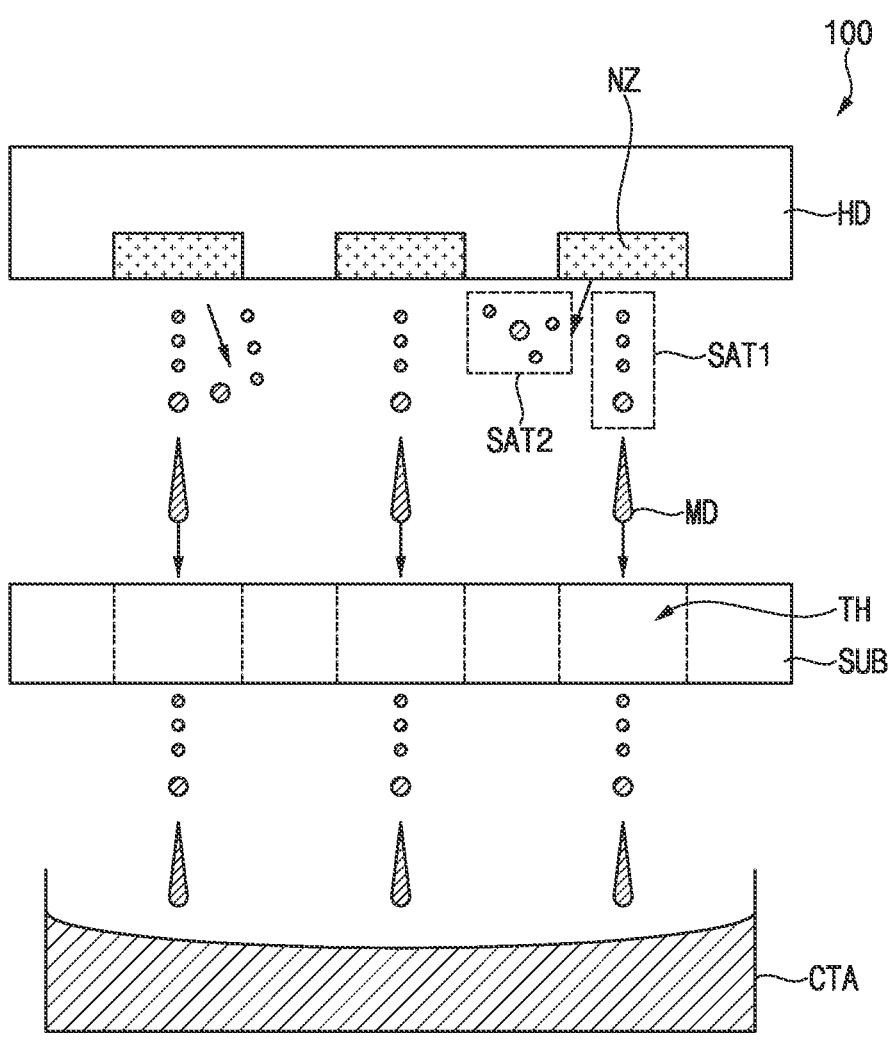
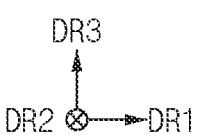

FIG. 9

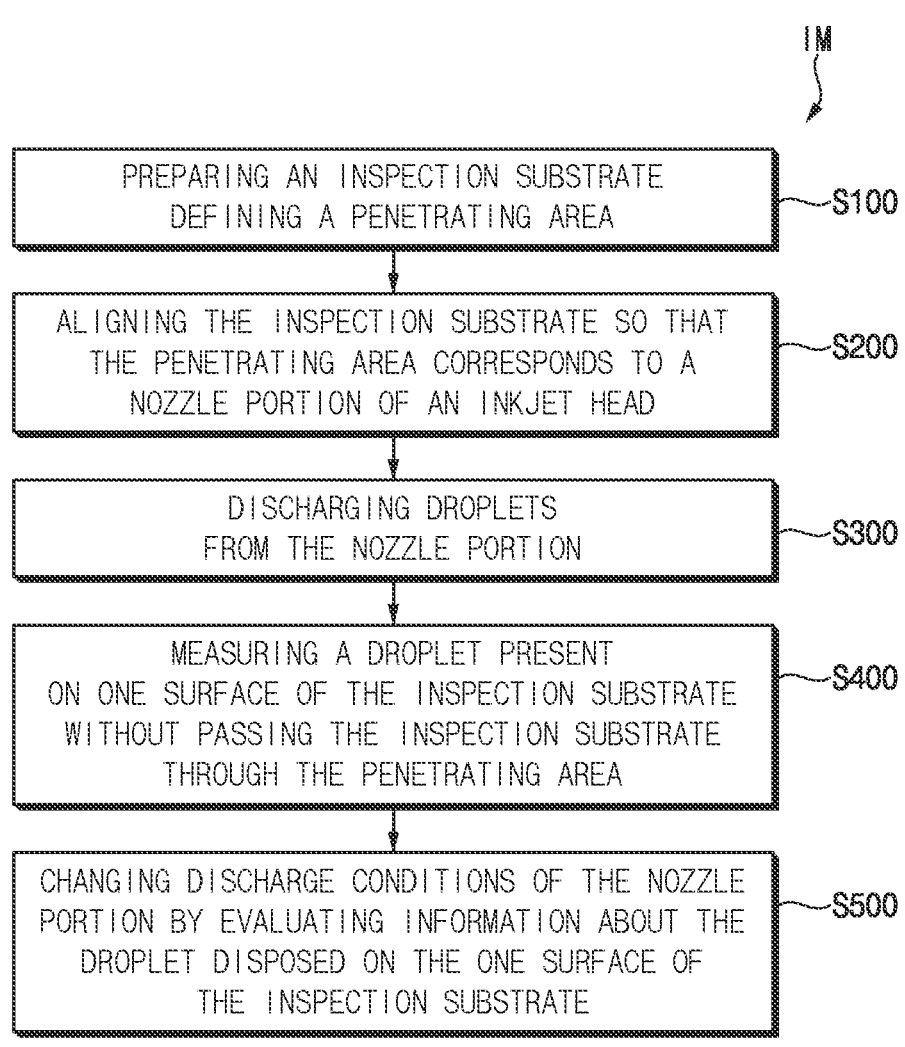

IM

PREPARING AN INSPECTION SUBSTRATE
DEFINING A PENETRATING AREA ──S100

ALIGNING THE INSPECTION SUBSTRATE SO THAT
THE PENETRATING AREA CORRESPONDS TO A
NOZZLE PORTION OF AN INKJET HEAD ──S200

DISCHARGING DROPLETS
FROM THE NOZZLE PORTION ──S300

MEASURING A DROPLET PRESENT
ON ONE SURFACE OF THE INSPECTION SUBSTRATE
WITHOUT PASSING THE INSPECTION SUBSTRATE
THROUGH THE PENETRATING AREA ──S400

CHANGING DISCHARGE CONDITIONS OF THE NOZZLE
PORTION BY EVALUATING INFORMATION ABOUT THE
DROPLET DISPOSED ON THE ONE SURFACE OF
THE INSPECTION SUBSTRATE ──S500

FIG. 10
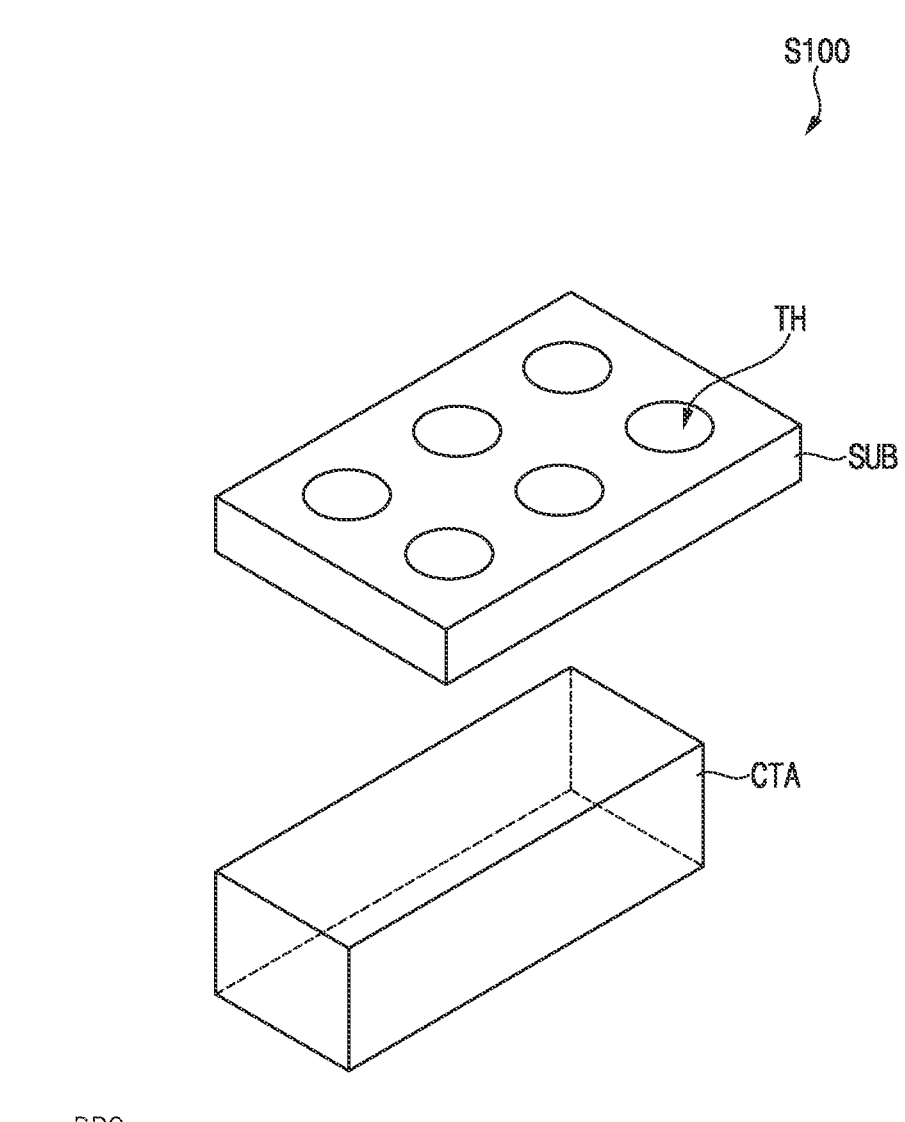
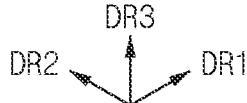

FIG. 11
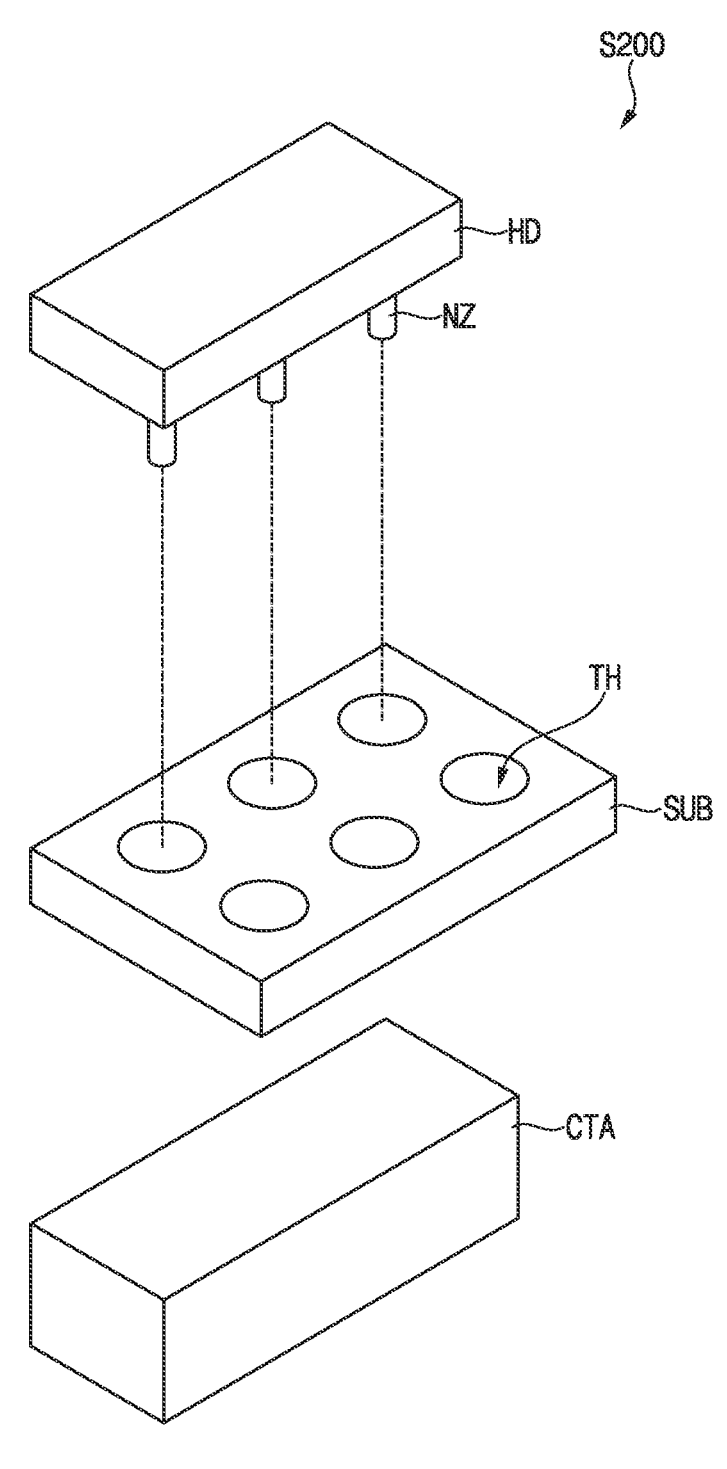
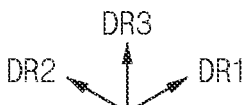

FIG. 12
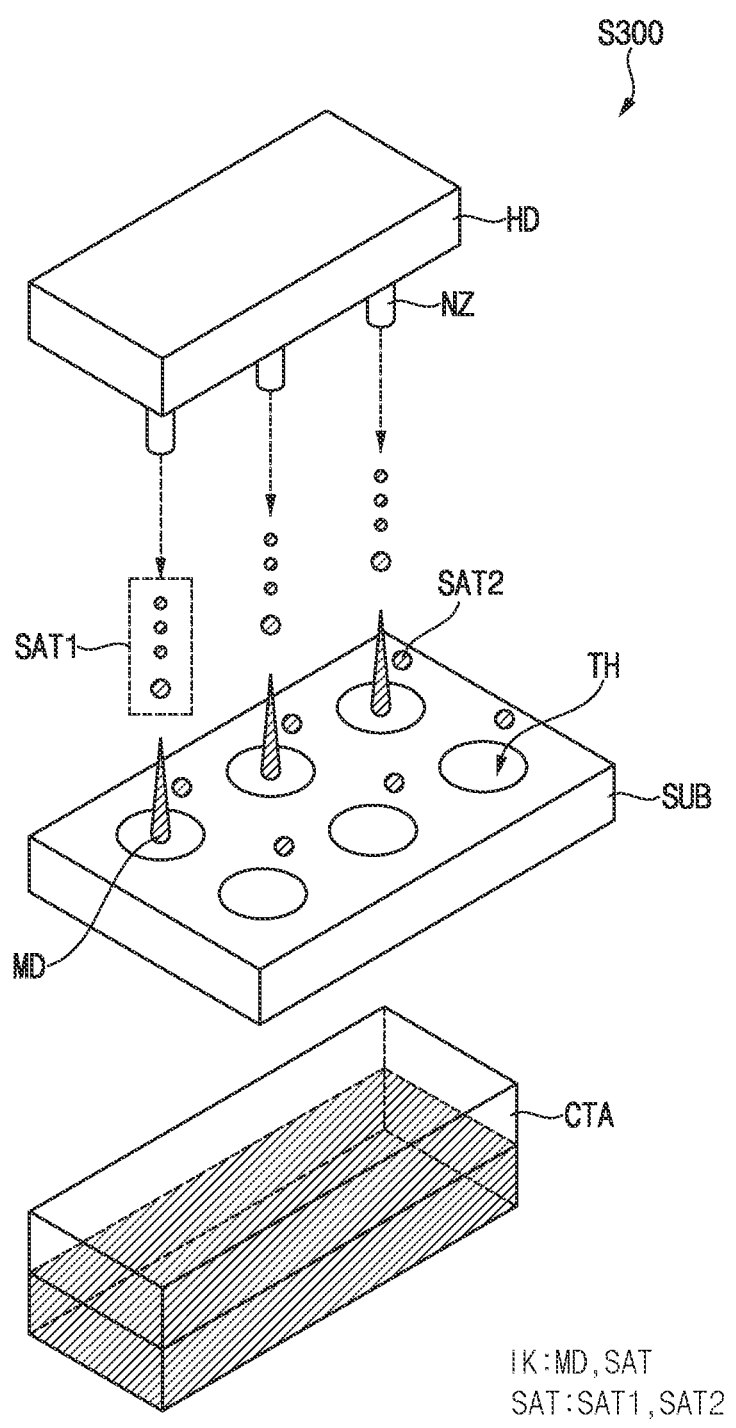
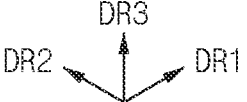

FIG. 13
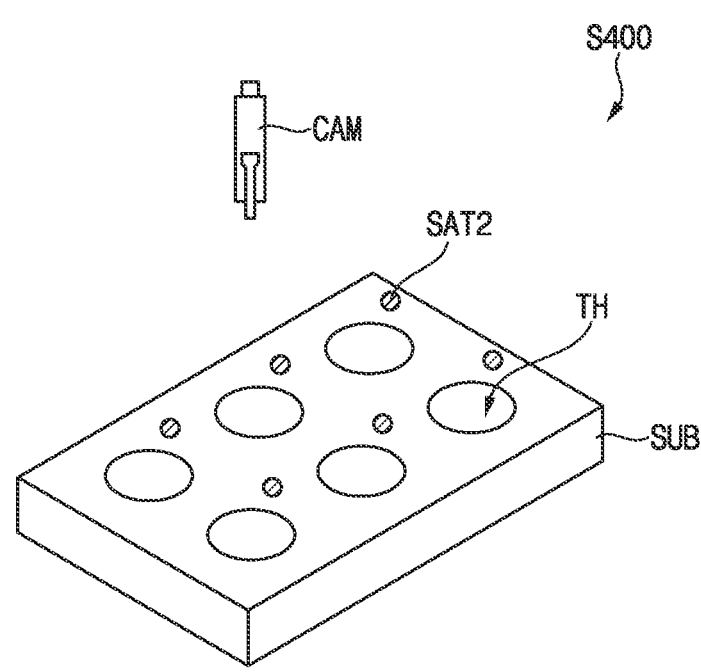
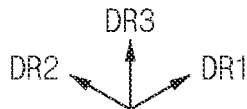

APPARATUS FOR INSPECTING DROPLET AND METHOD FOR INSPECTING DROPLET USING THE SAME

This application claims priority to Korean Patent Application No. 10-2023-0101230, filed on Aug. 2, 2023, and all the benefits accruing therefrom under 35 U.S.C. § 119, the content of which in its entirety is herein incorporated by reference.

BACKGROUND

1. Field

The disclosure relates generally to an apparatus for inspecting droplet. More particularly, the disclosure relates to an apparatus for inspecting droplet and a method for inspecting droplet using the same.

2. Description of the Related Art

A printing apparatus including an inkjet head is used to form an alignment layer or apply ultra-violet ("UV") ink on a substrate in a process of manufacturing a liquid crystal display device, or to apply ink to a substrate in a process of manufacturing an organic light-emitting display device.

In the process using the inkjet head, an inspection apparatus may be used to inspect the amount of a droplet discharged from each of a plurality of nozzles included in the inkjet head and whether or not the droplet is discharged.

SUMMARY

Embodiments provide a droplet inspection apparatus that inspects droplet discharge defects.

Embodiments provide a droplet inspection method for inspecting droplet discharge defects.

An apparatus for inspecting a droplet among a plurality of droplets in an embodiment of the disclosure includes an inspection substrate defining a penetrating area corresponding to a nozzle portion that discharges the plurality of droplets, the penetrating area through which at least some of the plurality of droplets, which are discharged from the nozzle portion, pass and a camera that measures the droplet disposed on one surface of the inspection substrate without passing the inspection substrate through the penetrating area.

In an embodiment, the plurality of droplets discharged from the nozzle portion may include a main droplet and a satellite droplet. A volume of the satellite droplet may be smaller than a volume of the main droplet.

In an embodiment, the camera may measure the satellite droplet disposed on the one surface of the inspection substrate.

In an embodiment, the nozzle portion may include a plurality of nozzles arranged in a line along a first direction in a plan view, and the penetrating area may define a plurality of penetrating holes respectively corresponding to the plurality of nozzles. A first interval between the plurality of penetrating holes in the first direction may be an integer multiple of a second interval between the plurality of nozzles in the first direction.

In an embodiment, the plurality of penetrating holes may correspond one-to-one with the plurality of nozzles.

In an embodiment, the plurality of penetrating holes may include a plurality of groups arranged in the line along the first direction in the plan view. The plurality of groups may be arranged along a second direction crossing the first direction.

In an embodiment, the plurality of penetrating holes may be arranged in a zigzag shape in the plan view.

In an embodiment, a maximum length of each of the plurality of penetrating holes in the first direction may be smaller than the second interval between the plurality of nozzles in the first direction.

In an embodiment, the inspection substrate may include a liquid-repellent material.

In an embodiment, the apparatus may further include a receiving portion positioned under the inspection substrate and that accommodates a droplet, among the plurality of droplets, passing the inspection substrate through the penetrating area.

A method for inspecting a droplet among a plurality of droplets in an embodiment of the disclosure includes preparing an inspection substrate defining a penetrating area through which at least some of the plurality of droplets, which are discharged from a nozzle portion, pass, aligning the inspection substrate so that the penetrating area corresponds to the nozzle portion, discharging the plurality of droplets from the nozzle portion, and measuring the droplet disposed on one surface of the inspection substrate without passing the inspection substrate through the penetrating area.

In an embodiment, the plurality of droplets discharged from the nozzle portion may include a main droplet and a satellite droplet. A volume of the satellite droplet may be smaller than a volume of the main droplet. The main droplet may be discharged before the satellite droplet.

In an embodiment, the main droplet may pass the inspection substrate through the penetrating area. A portion of the satellite droplet may be disposed on the one surface of the inspection substrate without passing through the inspection substrate.

In an embodiment, in the measuring the droplet on the one surface of the inspection substrate, the portion of the satellite droplet may be measured.

In an embodiment, the method may further include changing discharge conditions of the nozzle portion by evaluating information about the droplet disposed on the one surface of the inspection substrate after the measuring the droplet.

In an embodiment, the nozzle portion may include a plurality of nozzles arranged in a line along a first direction in a plan view. The penetrating area may define a plurality of penetrating holes. The plurality of penetrating holes may be aligned to respectively correspond to the plurality of nozzles in the aligning the inspection substrate.

In an embodiment, a first interval between the plurality of penetrating holes in the first direction may be an integer multiple of a second interval between the plurality of nozzles in the first direction.

In an embodiment, a maximum length of each of the plurality of penetrating holes in the first direction may be smaller than the second interval between the plurality of nozzles in the first direction.

In an embodiment, in the aligning the inspection substrate, the inspection substrate is aligned so that the plurality of penetrating holes correspond one-to-one with the plurality of nozzles.

In an embodiment, the nozzle portion may move along a second direction crossing the first direction.

A droplet inspection apparatus in an embodiment of the disclosure may include an inspection substrate defining a plurality of penetrating holes through which at least some of a plurality of droplets, which are discharged from each of a plurality of nozzles, pass and a camera that measures a droplet disposed on one surface of the inspection substrate. In this case, the droplet disposed on the one surface of the inspection substrate may be a satellite droplet that is not discharged to a target position.

By defining the penetrating holes through which at least some of the droplets pass the inspection substrate, each of the nozzles may discharge hundreds of thousands to millions of the droplets while the position of an inkjet head is fixed. The camera may measure the satellite droplet disposed on the one surface of the inspection substrate.

Accordingly, the droplet inspection apparatus may inspect discharge defects of the satellite droplet, where the occurrence frequency of the discharge defects is relatively low. In other words, the droplet inspection apparatus may simplify a process for inspecting discharge defects of the satellite droplet.

BRIEF DESCRIPTION OF THE DRAWINGS

Illustrative, non-limiting embodiments will be more clearly understood from the following detailed description in conjunction with the accompanying drawings.

FIG. 1 is a perspective view illustrating an embodiment of a droplet inspection apparatus according to the disclosure.

FIG. 2 is a side view illustrating the droplet inspection apparatus of FIG. 1.

FIG. 9 is a flowchart of an embodiment of a droplet inspection method according to the disclosure.

FIGS. 10, 11, 12, and 13 are perspective views for describing the droplet inspection method of FIG. 9.

DETAILED DESCRIPTION

Figure 3:
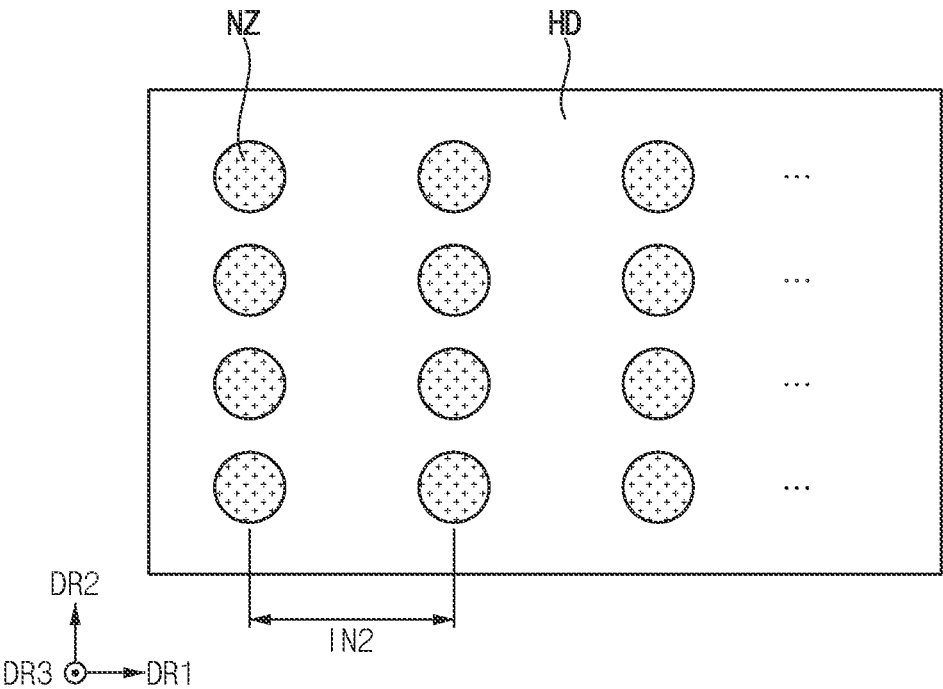
FIG. 3 is a plan view illustrating an embodiment of the inkjet head of FIG. 1.

Hereinafter, embodiments of the disclosure will be described in detail with reference to the accompanying drawings. The same reference numerals are used for the same components in the drawings, and redundant descriptions of the same components will be omitted.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term such as "about" can mean within one or more standard deviations, or within +30%, 20%, 10%, 5% of the stated value, for example.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 is a perspective view illustrating an embodiment of a droplet inspection apparatus according to the disclosure. FIG. 2 is a side view illustrating the droplet inspection apparatus of FIG. 1.

In this specification, a plane may be defined by a first direction DR1 and a second direction DR2 crossing the first direction DR1. In an embodiment, the first direction DR1 and the second direction DR2 may be perpendicular to each other, for example. A direction normal to the plane, that is, a thickness direction of an inspection substrate SUB may be a third direction DR3. In other words, the third direction DR3 may be perpendicular to each of the first direction DR1 and the second direction DR2.

Referring to FIGS. 1 and 2, a droplet inspection apparatus 100 in an embodiment of the disclosure may include the inspection substrate SUB, a camera CAM, and a receiving portion CTA.

The droplet inspection apparatus 100 in an embodiment of the disclosure may be used to inspect droplets IK discharged from a nozzle portion included in an inkjet head HD.

The inkjet head HD may be included in a printing apparatus for forming an alignment film or applying ultraviolet ("UV") ink on a substrate in a process of manufacturing a liquid crystal display device, a printing apparatus for applying ink on a substrate in a process of manufacturing an organic light-emitting display device, or the like.

The inkjet head HD may include the nozzle portion capable of discharging the droplets IK, and the nozzle portion may include a plurality of nozzles NZ. The nozzles NZ may be arranged in a line along the first direction DR1. Each of the nozzles NZ may discharge the droplets IK.

The droplet IK may be a liquid including various materials. In an embodiment, the droplet IK may be an organic luminescent ink for forming pixels included in a display device, for example. In this case, the organic luminescent ink may be an ink mixed with an organic luminescent material and a solvent. The organic luminescent material may be is a red organic luminescent material, a green organic luminescent material, or a blue organic luminescent material. The organic luminescent material may emit light (e.g., red light, green light, or blue light) when a voltage is applied. The solvent may be a material capable of dissolving the organic luminescent material. The solvent may be a material that is readily miscible with the organic luminescent material.

The droplets IK may include a main droplet MD and a satellite droplet SAT. The main droplet MD may be discharged before the satellite droplet SAT. In addition, the volume of the satellite droplet SAT may be smaller than the volume of the main droplet MD. The discharge amount and the discharge frequency of the satellite droplet SAT may vary depending on the physical properties (e.g., viscosity, surface tension, etc.) of the droplets IK, the temperature of the nozzle NZ, the voltage applied to the inkjet head HD, and the distance between the nozzle NZ and a substrate, etc.

As illustrated in FIG. 2, some of the satellite droplets SAT may not be discharged to a target position due to various reasons (e.g., generation of air current, adsorption of foreign material on the nozzle NZ). In other words, the satellite droplets SAT may include a first satellite droplet SAT1 that is discharged to the target position along a direction opposite to the third direction DR3 and a second satellite droplet SAT2 that is not discharged to the target position. In an embodiment, the droplet inspection apparatus 100 may inspect for the second satellite droplet SAT2 that is not discharged to the target position among the droplets IK discharged from the nozzle NZ. In other words, the droplet inspection apparatus 100 may inspect discharge defects of the satellite droplet SAT of the nozzle NZ.

The inspection substrate SUB may include a transparent or opaque material. In an embodiment, the inspection substrate SUB may include glass or plastic, for example. In this case, the inspection substrate SUB may include a quartz substrate, a synthetic quartz substrate, a calcium fluoride substrate, a fluorine-doped quartz substrate, a soda-lime glass substrate, a non-alkali glass substrate, a polyimide substrate, a polycarbonate substrate, etc. These may be used alone or in any combinations with each other.

The inspection substrate SUB may define a penetrating area which at least some of the droplets IK discharged from the nozzle portion pass. The penetrating area may be disposed on the same line as the nozzle portion in cross-section. In addition, the penetrating area may define a plurality of penetrating holes TH. The penetrating holes TH may correspond to the nozzles NZ, respectively. That is, the penetrating holes TH may be disposed on the same line as the nozzles NZ in the cross-section, respectively. In other words, the penetrating holes TH may be disposed on the same line, that is extending in the third direction DR3, as the nozzles NZ, respectively. Accordingly, at least some of the droplets IK discharged from each of the nozzles NZ may pass the inspection substrate SUB through the penetrating hole TH.

In an embodiment, each of the penetrating holes TH may have an elliptical planar shape. However, the disclosure is not limited thereto, and each of the penetrating holes TH may have various planar shapes. In an embodiment, each of the penetrating holes TH may have one of a triangular planar shape, a quadrangular planar shape, e.g., a rectangular planar shape, a circular planar shape, etc., for example.

Specifically, the droplets IK discharged from each of the nozzles NZ to the target position along the direction opposite to the third direction DR3 may pass the inspection substrate SUB through the penetrating hole TH. In contrast, a droplet that is not discharged to the target position may not enter the penetrating hole TH. In this case, the droplet that is not discharged to the garget position may be the second satellite droplet SAT2. In other words, the second satellite droplet SAT2 may land on one surface of the inspection substrate SUB without passing through the inspection substrate SUB. As a result, the second satellite droplet SAT2 may be disposed on the one surface of the inspection substrate SUB without passing through the inspection substrate SUB.

In an embodiment, the inspection substrate SUB may further include a liquid-repellent material. In an embodiment, the liquid-repellent material may include a fluorine-based compound or a siloxane-based compound, for example. The liquid-repellent material may be disposed on a surface of the inspection substrate SUB. In other words, the liquid-repellent material may cover the surface of the inspection substrate SUB. Accordingly, the surface of the inspection substrate SUB may have liquid repellency.

As the surface of the inspection substrate SUB has liquid repellency, a contact angle between the inspection substrate SUB and the second satellite droplet SAT2 disposed on the one surface of the inspection substrate SUB may increase. In other words, a bonding force between the surface of the inspection substrate SUB and the second satellite droplet SAT2, and a surface tension of the second satellite droplet SAT2 disposed on the one surface of the inspection substrate SUB may increase. Accordingly, the camera CAM may measure the second satellite droplet SAT2 more accurately.

The camera CAM may be disposed on the one surface of the inspection substrate SUB. The camera CAM may measure a droplet disposed on the one surface of the inspection substrate SUB. Specifically, the camera CAM may measure the second satellite droplet SAT2 disposed on the one surface of the inspection substrate SUB. In other words, the camera CAM may photograph the one surface of the inspection substrate SUB and measure an image of the second satellite droplet SAT2 disposed on the one surface of the inspection substrate SUB. Accordingly, the camera CAM may measure the size of the second satellite droplet SAT2 and the number of the second satellite droplet SAT2 disposed on the one surface of the inspection substrate SUB. In an embodiment, the camera CAM may be a line scan camera or an area scan camera, for example.

The receiving portion CTA may be disposed under the inspection substrate SUB. The receiving portion CTA may accommodate the droplets IK passing the inspection substrate SUB through the penetrating area. Here, the droplets IK accommodated in the receiving portion CTA may include the main droplet MD and the first satellite droplet SAT1. In other words, the second satellite droplet SAT2 that is not discharged at the target position may not be accommodated in the receiving portion CTA.

The droplet inspection apparatus 100 in an embodiment of the disclosure may include the inspection substrate SUB that defines the penetrating holes TH through which at least some of the droplets IK discharged from each of the nozzles NZ pass and the camera CAM that measures the second satellite droplet SAT2 disposed on the one surface of the inspection substrate SUB. By defining the penetrating holes TH through which at least some of the droplets IK pass the inspection substrate SUB, each of the nozzles NZ may discharge hundreds of thousands to millions of the droplets IK while the position of the inkjet head HD is fixed. After each of the nozzles NZ discharges the droplets IK, the camera CAM may measure the second satellite droplet SAT2 that is disposed on the one surface of the inspection substrate SUB and is not discharged to the target position. Accordingly, the droplet inspection apparatus 100 may inspect discharge defects of the satellite droplet SAT, where the occurrence frequency of the discharge defects is relatively low. In other words, the droplet inspection apparatus 100 may simplify a process for inspecting discharge defects of the satellite droplet SAT.

Figure 4:
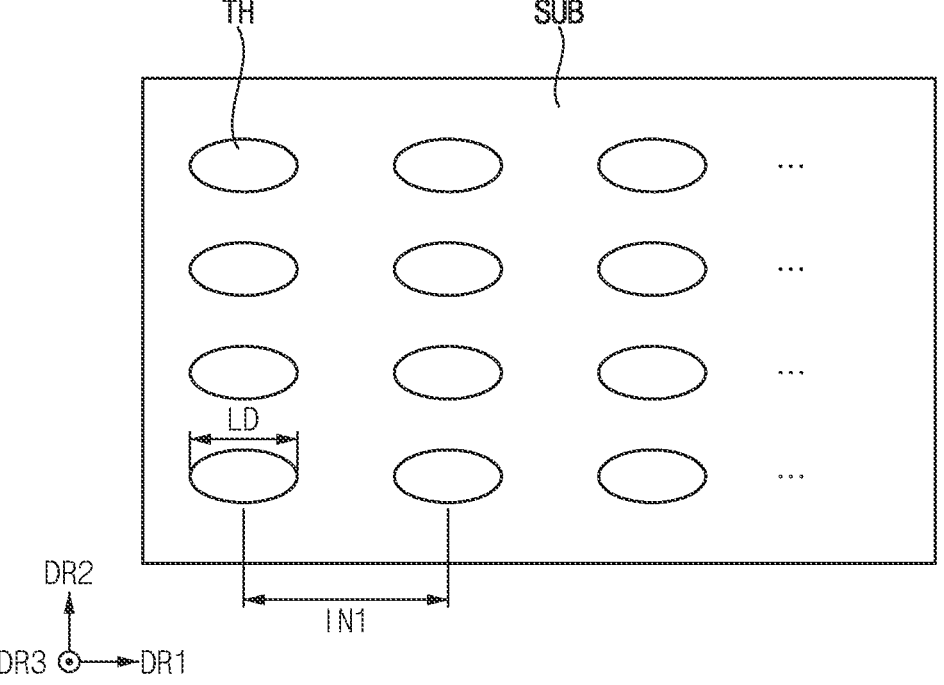
FIG. 4 is a plan view illustrating an embodiment of the substrate of FIG. 1.
Figure 5:
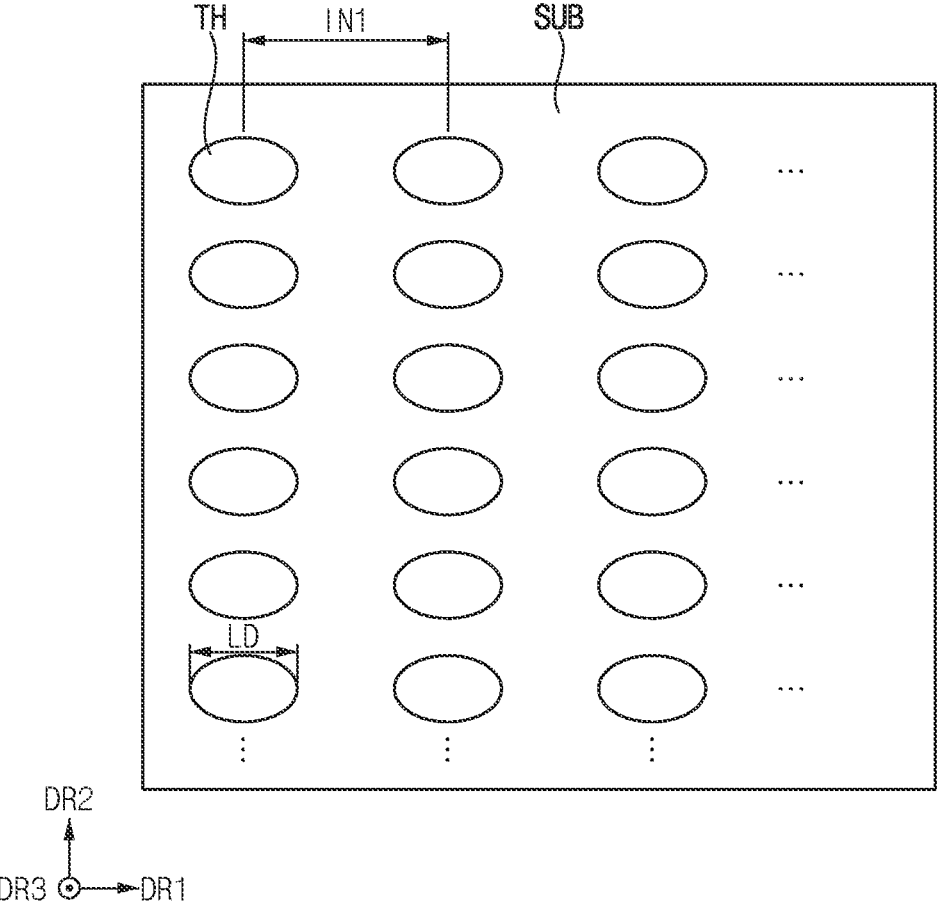
FIG. 5 is a plan view illustrating another embodiment of the substrate of FIG. 1.

FIG. 3 is a plan view illustrating an embodiment of the inkjet head of FIG. 1. FIG. 4 is a plan view illustrating an embodiment of the substrate of FIG. 1. FIG. 5 is a plan view illustrating another embodiment of the substrate of FIG. 1.

Referring to FIGS. 3, 4, and 5, the inkjet head HD may include the nozzle portion, and the nozzle portion may include the nozzles NZ. The nozzles NZ may be arranged in a line along a row direction in a plan view. In other words, the nozzles NZ may be arranged in a line along the first direction DR1 in a plan view. In this case, an interval between the nozzles NZ in the first direction DR1 may be defined as a second interval IN2. In an embodiment, the number of the nozzles NZ repeatedly arranged in one row may be about 128 or about 256, for example. However, the number of the nozzles NZ is not limited thereto.

In addition, the nozzles NZ may be arranged in a line along a column direction in a plan view. In other words, the nozzles NZ may be arranged in a line along the second direction DR2 in a plan view. That is, the nozzles NZ may include a plurality of groups arranged in a line along the first direction DR2 in a plan view, and the plurality of groups may be arranged along the second direction DR2.

The penetrating area may be defined in the inspection substrate SUB, and the penetrating area may define the penetrating holes TH. The penetrating holes TH may correspond to the nozzles NZ, respectively. In other words, the penetrating holes TH may be disposed on the same line as the nozzles NZ in the cross-section, respectively. The penetrating holes TH may be arranged in a line along the row direction in a plan view. In other words, the penetrating holes TH may be arranged in a line along the first direction DR1 in a plan view. In an embodiment, an interval between the penetrating holes TH in the first direction DR1 may be defined as a first interval IN1, and the first interval IN1 may be equal to the second interval IN2.

In addition, the penetrating holes TH may be arranged in a line along the column direction in a plan view. In other words, the penetrating holes TH may be arranged in a line along the second direction DR2 in a plan view. That is, the penetrating holes TH may include a plurality of groups arranged in a line along the first direction DR1 in a plan view, and the plurality of groups may be arranged along the second direction DR2.

In an embodiment, a maximum length LD of each of the penetrating holes TH in the first direction DR1 may be smaller than an interval between the nozzles NZ in the first direction DR1. In other words, the maximum length LD of each of the penetrating holes TH in the first direction DR1 may be smaller than the second interval IN2. In an embodiment, each of the penetrating holes TH May have an elliptical planar shape, for example. In this case, the maximum length LD of each of the penetrating holes TH in the first direction DR1 may be defined as a length of the long axis of the ellipse. When the maximum length LD of each of the penetrating holes TH in the first direction DR1 exceeds the second interval IN2, the penetrating holes TH adjacent to each other in the first direction DR1 may overlap each other in a plan view. In this case, the size of the second satellite droplet and the number of the second satellite droplet may be inaccurately measured.

In an embodiment, as illustrated in FIG. 4, the penetrating holes TH may be defined in the inspection substrate SUB to correspond one-to-one with the nozzles NZ. In other words, the number of the penetrating holes TH defined in the inspection substrate SUB may be equal to the number of the nozzles NZ included in the inkjet head HD.

In another embodiment, as illustrated in FIG. 5, the number of the penetrating holes TH defined in the inspection substrate SUB may be greater than the number of the nozzles NZ included in the inkjet head HD. In this case, the number of the penetrating holes TH and the number of the nozzles NZ repeatedly arranged in one row may be the same, and the number of the penetrating holes TH repeatedly arranged in one column may be greater than the number of the nozzles NZ repeatedly arranged in one column. In this case, the nozzle portion may move along the second direction DR2. Specifically, the inkjet head HD may move along the second direction DR2. In other words, the inkjet head HD may move along the column direction.

Figure 6:
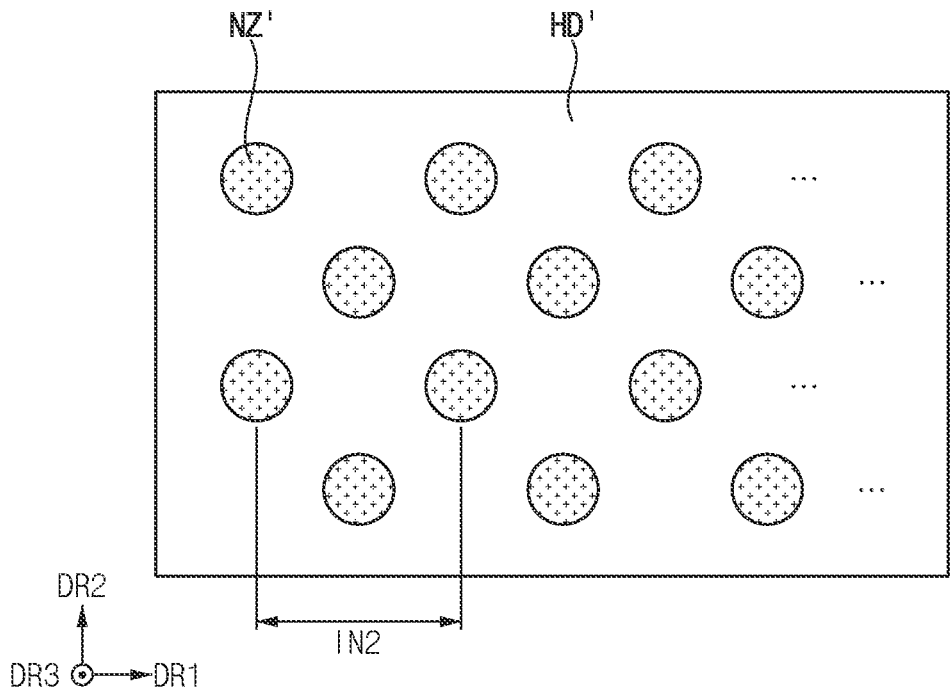
FIG. 6 is a plan view illustrating another embodiment of the inkjet head of FIG. 1.
Figure 7:
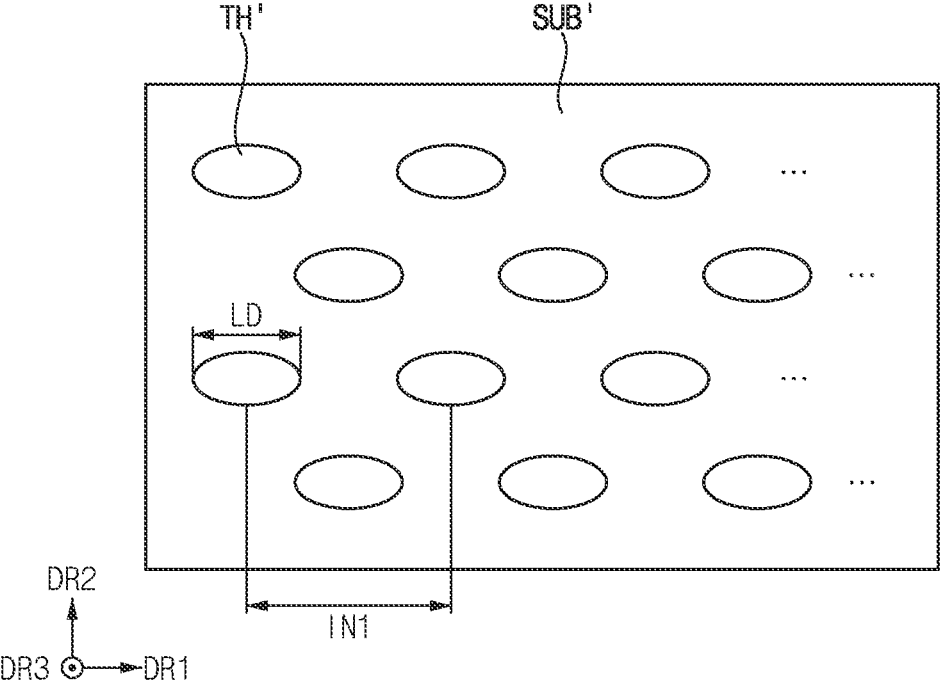
FIG. 7 is a plan view illustrating another embodiment of the substrate of FIG. 1.
Figure 8:
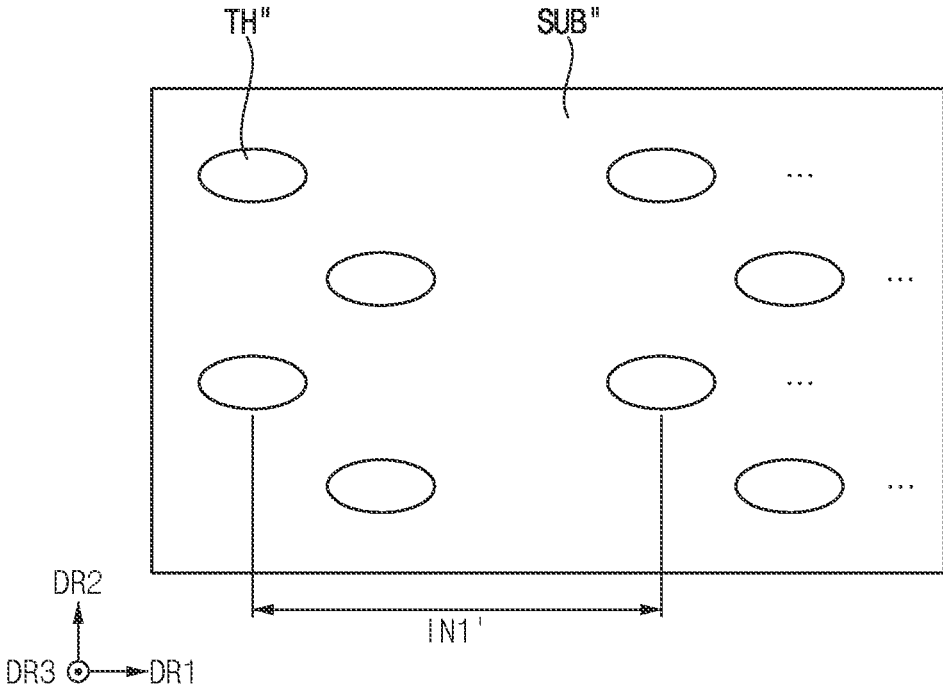
FIG. 8 is a plan view illustrating another embodiment of the substrate of FIG. 1.

FIG. 6 is a plan view illustrating another embodiment of the inkjet head of FIG. 1. FIG. 7 is a plan view illustrating another embodiment of the substrate of FIG. 1. FIG. 8 is a plan view illustrating another embodiment of the substrate of FIG. 1.

Referring to FIGS. 6, 7, and 8, an inkjet head HD' may include a nozzle portion, and the nozzle portion may include nozzles NZ'. The nozzles NZ' may be arranged in a line along the row direction in a plan view. In other words, the nozzles NZ' may be arranged in a line along the first direction DR1 in a plan view. In this case, an interval between the nozzles NZ' in the first direction DR1 may be defined as a second interval IN2. In an embodiment, the number of the nozzles NZ' repeatedly arranged in one row may be about 128 or about 256, for example. However, the number of the nozzles NZ' is not limited thereto.

In addition, the nozzles NZ' may be repeatedly arranged along the column direction in a plan view. In other words, the nozzles NZ' may be repeatedly arranged along the second direction DR2 in a plan view. In an embodiment, the nozzles NZ' may be arranged in a zigzag shape in a plan view, for example.

A penetrating area is defined in an inspection substrate SUB', and the penetrating area may define penetrating holes TH'. The penetrating holes TH' may correspond to the nozzles NZ', respectively. In other words, the penetrating holes TH' may be disposed on the same line as the nozzles NZ' in the cross-section. The penetrating holes TH' may be arranged in a line along the row direction in a plan view. In other words, the penetrating holes TH' may be arranged in a line along the first direction DR1 in a plan view. An interval between the penetrating holes TH' in the first direction DR1 may be defined as a first interval IN1.

In addition, the penetrating holes TH' may be repeatedly arranged along the column direction in a plan view. In other words, the penetrating holes TH' may be repeatedly arranged along the second direction DR2 in a plan view. In an embodiment, the penetrating holes TH' may be arranged in a zigzag shape in a plan view, for example.

In an embodiment, the interval between the penetrating holes TH' in the first direction DR1 may be an integer multiple of the interval between the nozzles NZ' in the first direction DR1. In other words, the first interval IN1 may be an integer multiple of the second interval IN2.

In an embodiment, as illustrated in FIG. 7, the first interval IN1 may be one times the second interval IN2, for example. In other words, the second interval IN2 may be equal to the first interval IN1.

In another embodiment, as illustrated in FIG. 8, the first interval IN1' may be twice the second interval IN2. In this case, the droplet inspection apparatus 100 may inspect the satellite droplet discharge defects of nozzles disposed in odd-numbered columns among the nozzles NZ' repeatedly arranged in one row. In an alternative embodiment, the droplet inspection apparatus 100 may inspect the satellite droplet discharge defects of nozzles disposed in even-numbered columns among the nozzles NZ' repeatedly arranged in one row.

FIG. 9 is a flowchart of an embodiment of a droplet inspection method according to the disclosure. FIGS. 10, 11, 12, and 13 are perspective views for describing the droplet inspection method of FIG. 9.

Referring to FIG. 9, a droplet inspection method IM in an embodiment of the disclosure may include preparing an inspection substrate defining a penetrating area (S100), aligning the inspection substrate so that the penetrating area corresponds to a nozzle portion of an inkjet head (S200), discharging droplets from the nozzle portion (S300), measuring a droplet on one surface of the inspection substrate without passing the inspection substrate through the penetrating area (S400), and changing discharge conditions of the nozzle portion by evaluating information about the droplet on the one surface of the inspection substrate (S500).

Referring further to FIG. 10, the inspection substrate SUB defining the penetrating area may be prepared (S100).

The inspection substrate SUB may define the penetrating area through which droplets may pass, and the penetrating area may define the plurality of penetrating holes TH. In an embodiment, the inspection substrate SUB may define six penetrating holes TH, for example. Three penetrating holes TH may be arranged in a line in each of a first row and a second row along the first direction DR1. However, the disclosure is not limited thereto.

The receiving portion CTA may be disposed under the inspection substrate SUB. The receiving portion CTA may accommodate the droplets passing the inspection substrate SUB through the penetrating area.

Referring further to FIG. 11, the inspection substrate SUB may be aligned so that the nozzle portion of the inkjet head HD corresponds to the penetrating area (S200).

The inkjet head HD may include the nozzle portion capable of discharging the droplets, and the nozzle portion may include the plurality of nozzles NZ. In an embodiment, the inkjet head HD may include three nozzles NZ, and the three nozzles NZ may be arranged in a line along the first direction DR1, for example. However, the disclosure is not limited thereto.

The inspection substrate SUB may be aligned so that the penetrating holes TH correspond to the nozzles NZ, respectively. In an embodiment, in cross-section, the three nozzles NZ may be disposed on the same line as the three penetrating holes TH arranged in a line along the first direction DR1 in the first row, respectively, for example.

Referring further to FIG. 12, the droplets IK may be discharged from the nozzle portion (S300).

Each of the nozzles NZ included in the inkjet head HD may discharge the droplets IK. The droplets IK may include the main droplet MD and the satellite droplet SAT. The main droplet MD may be discharged before the satellite droplet SAT. In addition, the volume of the satellite droplet SAT may be smaller than the volume of the main droplet MD. The satellite droplet SAT may include the first satellite droplet SAT1 that is discharged to the target position along the direction opposite to the third direction DR3 and the second satellite droplet SAT2 that is not discharged to the target position.

The main droplet MD and the first satellite droplet SAT1 may pass the inspection substrate SUB through the penetrating hole TH. After passing through the inspection substrate SUB, the main droplet MD and the first satellite droplet SAT1 may be accommodated in the receiving portion CTA.

The second satellite droplet SAT2 may not enter the penetrating hole TH. In other words, the second satellite droplet SAT2 may land on one surface of the inspection substrate SUB without passing through the inspection substrate SUB. As a result, the second satellite droplet SAT2 may be disposed on the one surface of the inspection substrate SUB without passing through the inspection substrate SUB.

In an embodiment, while the position of the inkjet head HD is fixed, each of the nozzles NZ may discharge hundreds of thousands to millions of the droplets IK, for example. The droplet inspection method IM in an embodiment of the disclosure may include discharging hundreds of thousands to millions of the droplets IK from each of the nozzles NZ to inspect for discharge defects of the satellite droplet SAT, where the occurrence frequency of the discharge defects is relatively low.

After each of the nozzles NZ discharges hundreds of thousands to millions of the droplets IK with the position of the inkjet head HD fixed, the nozzle portion may move in a direction opposite to the second direction DR2. Specifically, the inkjet head HD may move in the direction opposite to the second direction DR2. Accordingly, in cross-section, the three nozzles NZ may be aligned so as to be disposed on the same line as three penetrating holes TH arranged in a line along the first direction DR1 in the second row. After aligning the nozzles NZ to correspond to the penetrating holes TH arranged in the second row, each of the nozzles NZ may discharge hundreds of thousands to millions of the droplets IK again while the position of the inkjet head HD is fixed. In an alternative embodiment, a process in which the inkjet head HD moves in the direction opposite to the second direction DR2 and each of the nozzles NZ discharges the droplets IK again may be omitted.

Referring further to FIG. 13, a droplet IK disposed on the one surface of the inspection substrate SUB may be measured (S400). Specifically, the second satellite droplet SAT2 disposed on the one surface of the inspection substrate SUB may be measured.

The camera CAM may be disposed on the one surface of the inspection substrate SUB. Accordingly, the camera CAM may measure the second satellite droplet SAT2 disposed on the one surface of the inspection substrate SUB. In other words, the camera CAM may photograph the one surface of the inspection substrate SUB and measure an image of the second satellite droplet SAT2 disposed on the one surface of the inspection substrate SUB. From the image of the second satellite droplet SAT2, the camera CAM may measure the size of the second satellite droplet SAT2 and the number of the second satellite droplet SAT2 on the one surface of the inspection substrate SUB.

The discharge conditions of the nozzle portion may be changed by evaluating information about the second satellite droplet SAT2 disposed on the one surface of the inspection substrate SUB (S500). Specifically, the discharge conditions of the inkjet head HD may be changed by evaluating information about the second satellite droplet SAT2.

Information about the second satellite droplet SAT2 measured by the camera CAM may be evaluated. That is, the size and number of the second satellite droplet SAT2 may be evaluated compared to the discharge amount of the droplets IK discharged from each of the nozzles NZ. In other words, the size and number of the second satellite droplet SAT2 may be evaluated compared to the number of the droplets IK discharged from each of the nozzles NZ. Accordingly, discharge defects of the satellite droplet SAT of the nozzles NZ may be inspected.

When the information about the second satellite droplet SAT2 is evaluated and exceeds the discharge defect standard value, the discharge conditions of the inkjet head HD may be changed. In an embodiment, the discharge conditions of the inkjet head HD may include the temperature of the nozzle NZ, the voltage applied to the inkjet head HD, and the distance between the nozzle NZ and a substrate, for example. In an alternative embodiment, when the information about the second satellite droplet SAT2 exceeds the discharge defect standard value, physical properties of the provided droplet IK may be changed, for example. In an embodiment, the physical properties of the droplet IK may include viscosity, surface tension, etc., for example.

The disclosure may be applied to various display devices. In an embodiment, the disclosure is applicable to various display devices such as display devices for vehicles, ships and aircraft, portable communication devices, display devices for exhibition or information transmission, medical display devices, or the like.

The foregoing is illustrative of the embodiments of the disclosure, and is not to be construed as limiting thereof. Although a few embodiments have been described with reference to the drawing figures, those skilled in the art will readily appreciate that many variations and modifications may be made therein without departing from the spirit and scope of the disclosure as defined in the appended claims.

What is claimed is:

1. An apparatus for inspecting a droplet among a plurality of droplets, the apparatus comprising:
   an inspection substrate defining a penetrating area corresponding to a nozzle portion which discharges the plurality of droplets, the penetrating area through which at least some of the plurality of droplets, which are discharged from the nozzle portion, pass; and a camera which measures the droplet disposed on one surface of the inspection substrate without passing the inspection substrate through the penetrating area.

2. The apparatus of claim 1, wherein the plurality of droplets discharged from the nozzle portion includes a main droplet and a satellite droplet, and
   a volume of the satellite droplet is smaller than a volume of the main droplet.

3. The apparatus of claim 2, wherein the camera measures the satellite droplet disposed on the one surface of the inspection substrate.

4. The apparatus of claim 1, wherein the nozzle portion includes a plurality of nozzles arranged in a line along a first direction in a plan view,
   the penetrating area defines a plurality of penetrating holes respectively corresponding to the plurality of nozzles, and
   a first interval between the plurality of penetrating holes in the first direction is an integer multiple of a second interval between the plurality of nozzles in the first direction.

5. The apparatus of claim 4, wherein the plurality of penetrating holes corresponds one-to-one with the plurality of nozzles.

6. The apparatus of claim 4, wherein the plurality of penetrating holes includes a plurality of groups arranged in the line along the first direction in the plan view,
   the plurality of groups is arranged along a second direction crossing the first direction.

7. The apparatus of claim 4, wherein the plurality of penetrating holes is arranged in a zigzag shape in the plan view.

8. The apparatus of claim 4, wherein a maximum length of each of the plurality of penetrating holes in the first direction is smaller than the second interval between the plurality of nozzles in the first direction.

9. The apparatus of claim 1, wherein the inspection substrate includes a liquid-repellent material.

10. The apparatus of claim 1, further comprising:
    a receiving portion disposed under the inspection substrate and which accommodates a droplet, among the plurality of droplets, passing the inspection substrate through the penetrating area.

11. A method for inspecting a droplet among a plurality of droplets, the method comprising:
    preparing an inspection substrate defining a penetrating area through which at least some of the plurality of droplets, which are discharged from a nozzle portion, pass;
    aligning the inspection substrate so that the penetrating area corresponds to the nozzle portion;
    discharging the plurality of droplets from the nozzle portion; and
    measuring the droplet disposed on one surface of the inspection substrate without passing the inspection substrate through the penetrating area.

12. The method of claim 11, wherein the plurality of droplets discharged from the nozzle portion includes a main droplet and a satellite droplet,
    a volume of the satellite droplet is smaller than a volume of the main droplet, and
    the main droplet is discharged before the satellite droplet.

13. The method of claim 12, wherein the main droplet passes the inspection substrate through the penetrating area, and a portion of the satellite droplet is disposed on the one surface of the inspection substrate without passing through the inspection substrate.

14. The method of claim 13, wherein in the measuring the droplet on the one surface of the inspection substrate, the portion of the satellite droplet is measured.

15. The method of claim 11, further comprising:

changing discharge conditions of the nozzle portion by evaluating information about the droplet disposed on the one surface of the inspection substrate after the measuring the droplet.

16. The method of claim 11, wherein the nozzle portion includes a plurality of nozzles arranged in a line along a first direction in a plan view, the penetrating area defines a plurality of penetrating holes, and the plurality of penetrating holes is aligned to respectively correspond to the plurality of nozzles in the aligning the inspection substrate.

17. The method of claim 16, wherein a first interval between the plurality of penetrating holes in the first direction is an integer multiple of a second interval between the plurality of nozzles in the first direction.

18. The method of claim 17, wherein a maximum length of each of the plurality of penetrating holes in the first direction is smaller than the second interval between the plurality of nozzles in the first direction.

19. The method of claim 16, wherein in the aligning the inspection substrate, the inspection substrate is aligned so that the plurality of penetrating holes corresponds one-to-one with the plurality of nozzles.

20. The method of claim 16, wherein the nozzle portion is movable along a second direction crossing the first direction.

* * * * *